US008689565B2

(12) United States Patent  
Guzman et al.

(10) Patent No.: US 8,689,565 B2  
(45) Date of Patent: Apr. 8, 2014

(54) METHOD OF PROVIDING ASYMMETRIC JOINT CONTROL FOR PRIMARY FREQUENCY REGULATION IN COMBINED-CYCLE POWER PLANTS

(75) Inventors: Benjamin Guzman, Buenos Aires (AR); Jorge Vugdelija, Province of Buenos Aires (AR); Julio Aguirre, Province of Buenos Aires (AR)

(73) Assignee: Petrobras Energia S.A., Buenos Aires (AR)

( * ) Notice: Subject to any disclaimer, the term of this patent is extended or adjusted under 35 U.S.C. 154(b) by 907 days.

(21) Appl. No.: 12/341,999

(22) Filed: Dec. 22, 2008

(65) Prior Publication Data

US 2009/0277183 A1     Nov. 12, 2009

(30) Foreign Application Priority Data

May 12, 2008    (AR) ............................. P20080102009

(51) Int. Cl.  
*F02C 1/00*        (2006.01)  
*F02C 9/18*        (2006.01)  
*F02C 6/14*        (2006.01)  
*F02G 1/00*        (2006.01)

(52) U.S. Cl.  
USPC .............. 60/773; 60/39.182; 60/772; 60/653; 60/677

(58) Field of Classification Search  
USPC .............. 60/39.182, 772, 773, 653, 662, 663, 60/677–680, 778, 39.15  
See application file for complete search history.

(56) References Cited

U.S. PATENT DOCUMENTS

| | | | | | |
|---|---|---|---|---|---|
| 4,357,803 | A | * | 11/1982 | Dickenson | 60/662 |
| 4,448,026 | A | * | 5/1984 | Binstock et al. | 60/662 |
| 4,455,836 | A | * | 6/1984 | Binstock et al. | 60/663 |
| 4,471,446 | A | * | 9/1984 | Podolsky et al. | 700/290 |
| 5,797,259 | A | * | 8/1998 | Nielsen et al. | 60/39.182 |
| 6,609,361 | B2 | * | 8/2003 | Vugdelija | 60/39.182 |
| 6,647,727 | B2 | * | 11/2003 | Klatt et al. | 60/653 |
| 6,912,855 | B2 | * | 7/2005 | Bescherer et al. | 60/772 |
| 6,978,620 | B2 | * | 12/2005 | Cooper et al. | 60/778 |
| 7,608,938 | B2 | * | 10/2009 | Andrew et al. | 290/52 |
| 2005/0198939 | A1 | * | 9/2005 | Hattori et al. | 60/39.182 |

\* cited by examiner

*Primary Examiner* — William H Rodriguez  
*Assistant Examiner* — Karthik Subramanian  
(74) *Attorney, Agent, or Firm* — Knobbe, Martens Olson & Bear, LLP

(57) ABSTRACT

A combined cycle power generation plant can include at least one gas turbine and at least one steam turbine. A method for providing Asymmetric Joint Control for Primary Frequency Regulation (PFR) in the combined cycle power generation plant can include the use of the spinning energy existing in the high pressure steam to rapidly supply additional power to the steam turbine for PFR service within the time frame established as a requirement to participate in the PFR service. The PFR control method can be carried out by controlling flow of high pressure steam to a medium pressure steam circuit through a bypass.

5 Claims, 6 Drawing Sheets

METHOD OF PROVIDING ASYMMETRIC JOINT CONTROL FOR PRIMARY FREQUENCY REGULATION IN COMBINED-CYCLE POWER PLANTS

RELATED APPLICATIONS

This application claims the benefit of Argentina Patent Application No. P20080102009 filed May 12, 2008, which is hereby expressly incorporated by reference in its entirety.

FIELD OF THE INVENTION

The present invention relates to an Asymmetric Joint Control method for providing Primary Frequency Regulation (PFR) in combined cycle power generation plants, which allows for increasing net power generated by turbines, without affecting the spinning reserve of combined cycle units for PFR purposes.

DESCRIPTION OF THE RELATED ART

In many countries, PFR is a function required by agencies in charge of load dispatch in power grids, and is considered to be one of the parameters characterizing the quality of power delivered to customers.

In order to participate in a PFR service, turbines must have available Spinning Reserve power, which is delivered to the power grid to which they are connected so as to effectively compensate for any variation in the mains frequency caused by sudden changes in demand.

The percentage of power saved as Spinning Reserve for PFR varies according to the power quality required by the grid at any given time.

For gas turbines forming part of a combined cycle, the Spinning Reserve for PFR is obtained by generating less power than the maximum output power that the turbines can generate. Therefore, to participate in the PFR service, gas turbines are restrained from generating a certain amount of power.

Originally, steam turbines in combined cycle facilities were not able to provide any significant amounts of additional power (minimum values from 3 to 10% of their rated output) within a very short period of time (response time in the order of a few seconds, e.g., from 10 to 30 seconds) so as to participate in the PFR service, thereby degrading the quality of the power supplied by combined cycles.

This problem was solved by obtaining spinning reserve power from the internal energy of steam stored within the dome and piping of the heat recovery boiler, then using the stored energy when the power demand in the grid increases sharply, according to the principles of operation of the PFR service. To implement this basic principle, as described in U.S. Pat. No. 6,609,361 B2, a complex control is performed by throttling the admission control valves of the steam turbine.

Differently from a gas turbine, a steam turbine does not decrease its net power output so as to have a Spinning Reserve available for PFR service, since its stationary power generation is a direct function of the available energy in the exhaust gases from the gas turbine.

Upon inclusion of PFR service in combined cycle steam turbines, both the gas turbines and the steam turbine forming the combined cycle regulate frequency symmetrically and independently. Consequently, all the turbines have the same percentage of Spinning Reserve power for PFR and participate independently.

FIG. 1 represents the active power generated in response to a rapid change in the reference frequency for a combined cycle facility having two gas turbines and one steam turbine, where the three turbines participate in frequency regulation as described above, without using the method of the present invention. An initial frequency value F, equal to the nominal value is assumed and then this value decreases. Curves GT1 and GT2 represent the output power behavior of the gas turbines, while TS represents the output power behavior of the steam turbine. The output power of the steam turbine reaches its final condition at similar times as the gas turbines, and said increase is sustained along the whole duration of the recording. Curve CC in FIG. 1 represents the output power response of the whole combined cycle assembly.

PFR in combined cycle power generation plants implemented as described above does not take full advantage of the system's ability to store energy as steam internal energy. This means that, without affecting the active power generation capacity of the combined cycle, the steam turbine still has enough Spinning Reserve capacity in the form of steam internal energy so as to play a more important role in the PFR service during a certain period of time.

Taking full advantage of the steam internal energy in the steam turbine to increase its role in the PFR service required by the power grid, would allow decreasing the requirements of Spinning Reserve energy for PFR on the gas turbines. This would result in a combined cycle plant altogether having the necessary spinning energy to meet the PFR requirements of the grid in generating more power.

Before the present invention, power generators associated to turbines forming part of structures known as combined cycle units, having at least one gas turbine and one steam turbine, were not fitted with Asymmetric Joint Control for PFR, which means that each turbine participated in the PFR service independently, setting aside the same percentage of reserve energy, without maximizing the use of the internal energy of steam in a steam turbine as spinning reserve to take part in the PFR service.

SUMMARY OF THE INVENTION

The present disclosure generally relates to a method for providing Asymmetric Joint Control for Primary Frequency Regulation (PFR) in combined cycle power generation plants comprising at least one gas turbine and at least one steam turbine, wherein the steam turbine of the combined cycle participates in the PFR through the accumulation of spinning reserve energy by throttling the control valves, (using for example, the method described in U.S. Pat. No. 6,609,361), and wherein the heat recovery steam generator and therefore the steam turbine of the combined cycle unit operate at three different steam pressures (high pressure, medium pressure and low pressure) and have a bypass enabling the high pressure steam to flow into the medium pressure steam circuit through a bypass control, and wherein the gas turbines increase their net power output and reduce their spinning reserve energy for PFR service, whereby the steam turbine increases its spinning reserve energy for PFR service to compensate for the deficit produced in the gas turbines, the above being achieved by using an Asymmetric Joint Control of PFR, wherein the overall power generated by the combined cycle unit is increased without losing spinning reserve energy for PFR service, the method comprising using the spinning energy existing in the high pressure steam to rapidly supply additional power to the steam turbine for the PFR service upon demand by the grid within the time frame established as a requirement to participate in the PFR service, and thus allowing the gas turbines to decrease their spinning reserve energy and therefore increase the net power generated by the combined cycle unit, whereby PFR control is carried out jointly in the whole combined cycle unit and the distribution of spinning reserve energy is asymmetric.

In some embodiments in connection with the foregoing method, in order to obtain additional power from the steam turbine during a certain period of time, part of the high pressure steam energy can be used in the medium pressure circuit of the turbine by slightly opening the high pressure by-pass valve, so that part of the steam produced in the high pressure dome of the steam recovery boiler is directed towards the medium pressure stage of the turbine, thus producing a temporary increase in the power generated by the steam turbine, the accumulation of energy taking place because the system is under a high steam pressure which is greater than that corresponding to the same load condition during normal operation of the turbine.

In some other embodiments in connection with the foregoing method, a temporary increase in output power of the steam turbine, based on the full use of the high pressure steam internal energy, without any need of additional external energy, may be used as spinning reserve energy to participate in the PFR service.

In still some other embodiments in connection with the foregoing method, the combined cycle unit increases net power output without losing spinning reserve energy for participating in the PFR service.

In some aspects of the present disclosure, the foregoing method may comprise the steps of:

(a) determining the additional power produced by the steam turbine when by-passing the high pressure steam to the medium pressure circuit, and therefore determining the useful spinning reserve energy that may be used for the PFR service;

(b) determining the maximum percentage of opening of the high pressure by-pass valve, to generate additional power in the steam turbine for use in PFR service according to step (a);

(c) the gas turbines and the steam turbine of the combined cycle unit must be participating in the PFR service and operating at full load;

(d) activating the Asymmetric Joint Control of PFR, which will increase the gas turbines output power set point, thus decreasing the spinning reserve energy for use in the PFR service based on the values determined in step (a);

(e) once the power in the gas turbines has reached the new output power set point, comparing such new power set point with the maximum operating power, to calculate the new spinning reserve energy for PFR, whose percentage will be less than that required by the grid at that moment;

(f) whereby the decrease in spinning reserve energy in the gas turbines is compensated for by the steam turbine through an increase in the spinning reserve energy for PFR from the steam turbine, calculated as a function of the percentage required by the power grid and the deficit of the gas turbines; and (g) when required, supplying the additional spinning reserve energy existing in the high pressure circuit of the steam turbine to the power grid by opening the high pressure by-pass valve of the steam turbine In some other aspects of the present disclosure, the foregoing method may further comprise the step of:

(h) if the drop in frequency lasts long enough to exceed the capability of the accumulated spinning reserve energy in the high pressure circuit, calculated as a function of the time during which the gas turbines remain in the ceiling condition, allowing the gas turbines to supply additional energy by injecting water to the input of the gas turbine air compressors, thus causing an increase in the power generated by the steam turbine to compensate for the deficit in spinning energy in the gas turbines for PFR service.

DETAILED DESCRIPTION OF THE PREFERRED EMBODIMENTS

Terms Used in the Description

Figure 1:
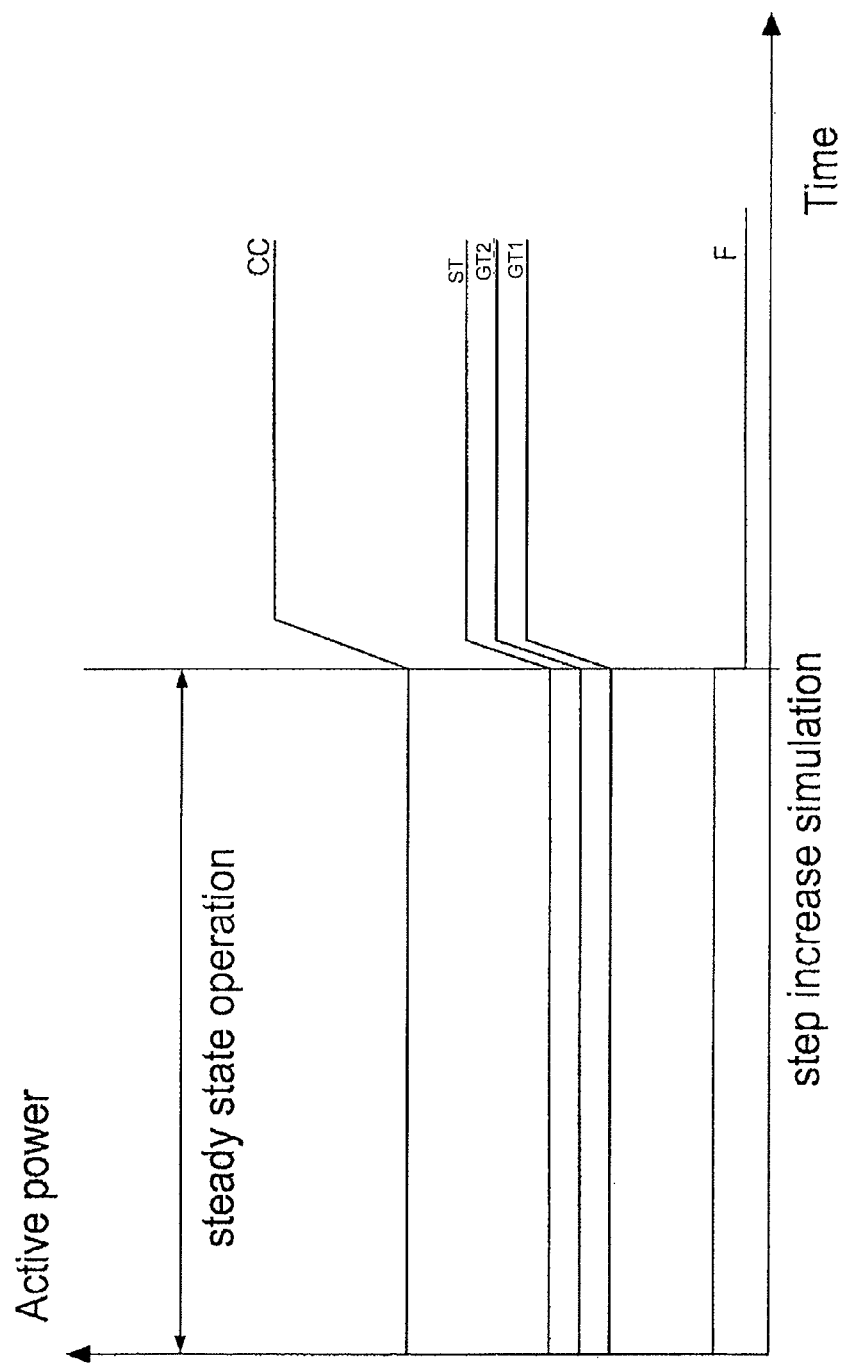
FIG. 1 shows the PFR-contributing Output Power Response of the turbines in a combined cycle unit (one Steam Turbine and two Gas Turbines), triggered by a sudden change in the reference frequency (e.g. 10% of PFR).

AJC Asymmetric Joint Control
ALBL Active Load Bias Logic
CC Combined Cycle
CCD Ceiling Condition Detection
ESC&C Energy Store Calculation And Control
Fx Steam valve characteristic function
GT Gas Turbine
HPSPB High Pressure Steam Pressure Bias
LB Load Bias
PBC Power Bias Control
PFR Primary Frequency Regulation
PS Pressure sensor
RefF Reference Frequency
SDL Standard Droop Logic
SLSP Steam Load Set-Point
STPSPTL Steam Turbine Power Set-Point Tracking Logic
SP Set Point
ST Steam Turbine
STCV Steam Turbine Control Valve
STHPBPV Steam Turbine High Pressure By-pass Valve
STSP Steam Turbine Power Set-Point Faced with the above described situation, the method of the invention provides the possibility for a combined cycle power plant to participate in the PFR service through an Asymmetric Joint Control, wherein the steam turbine provides a greater amount of spinning reserve energy for the PFR service than the gas turbines, taking full advantage of the internal energy of the steam in heat recovery boilers.

This asymmetry in the spinning reserve energy for PFR service, allows the gas turbines of the combined cycle unit to increase their net output power, as the decrease in spinning reserve energy will be offset by a greater use of the reserve energy in the steam turbine. Such power increase from the gas turbines will also result in a power increase in the steam turbine, since when the output power of the gas turbines changes, the energy available in the exhaust gases will also vary, so that such changes in the exhaust gases will finally translate into variations in the steam internal energy, which in turn will result in changes in the output power of the steam turbine in the same direction as in the gas turbines.

In conclusion, the basic operation principle of the method of the invention consists in maximizing the use of steam energy as internal spinning reserve energy, which leads to a greater amount of power generated by the combined cycle unit without an overall loss of spinning reserve energy available for the PFR service.

Operation Principles

In order to provide PFR through the Asymmetric Joint Control method of the present invention, a combined cycle electric power generating plant should meet the following requirements:

Firstly, the steam turbine of the combined cycle should be taking part in a PFR service, through the storage of spinning reserve energy by means of the throttling of the control valves, e.g. using the method described in U.S. Pat. No. 6,609,361 B2.

Secondly, the heat recovery boiler and therefore the steam turbine of the combined cycle unit, should operate at three different steam pressure levels (high pressure, medium pressure and low pressure) and should have a bypass to the high pressure steam circuit towards the medium pressure steam circuit fitted with a control bypass valve.

To achieve Asymmetric Joint Control of PFR in the combined cycle unit without losing the spinning reserve energy set aside for that purpose, when the gas turbines increase their net power output and reduce their spinning reserve energy, the steam turbine should still have additional spinning reserve energy so to offset the shortage in the gas turbines of the combined cycle.

The operation principle of the method of the invention consists in the use of spinning energy existing in the high pressure steam circuit to quickly provide additional energy to the steam turbine, so as to provide PFR service upon an increase in the demand from the grid, and to do so within the period of time as required to participate in the PFR service; this will in turn allow the gas turbines to decrease their spinning reserve energy and thus increase the net power output delivered by the combined cycle unit. This way, the PFR control is carried out jointly by the whole combined cycle assembly and the distribution of spinning reserve energy is asymmetric.

In order to obtain additional energy in the steam turbine during a certain period of time, part of the high pressure energy is used in the medium pressure circuit of the turbine, through a small opening of the high pressure bypass valve of the steam turbine, so that part of the steam produced in the high pressure dome of the steam recovery boiler, flows towards the medium pressure stage of the turbine, creating a temporary increase in the power generated by the steam turbine. The accumulation of energy takes place then because the units are under a higher steam pressure than that corresponding to the full load state for normal operation of the turbine.

Figure 2:
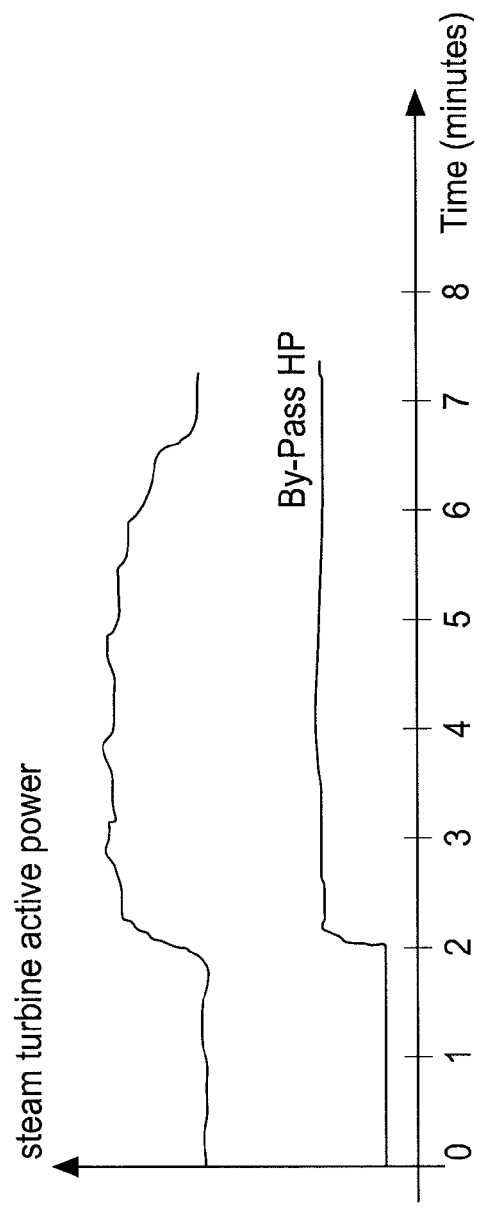
FIG. 2 shows the Power Output Response by the steam turbine operating at full load in a combined cycle, triggered by a small opening of the high pressure bypass valve.

FIG. 2 shows the power output response of the steam turbine operating at full load in a combined cycle unit, triggered by partially opening of the high pressure bypass valve. It can be seen that there is a fast increase of output power in the steam turbine, and that response time is just a few seconds, with the same power value remaining constant for several minutes.

This temporary increase in output power of the steam turbine, achieved by making full use of high pressure steam internal energy without need of any additional external energy, may be used as spinning reserve energy to participate in the PFR service.

In order to determine the additional power produced by the steam turbine when bypassing high pressure steam to the medium pressure circuit, and therefore determining the amount of useful spinning reserve energy for PFR according to the method of the invention, practical tests may be carried out to find out such value empirically. To carry out these tests, first the turbines must be operated at base load, with the steam admission valves 100% open in the "sliding pressure" mode, then opening the high pressure bypass valves to a small percentage. This test will provide information on the additional power generated, the response time and residence time. The test must be repeated for several different ambient conditions, selecting the lowest value of additional power obtained.

A further parameter to be determined is the maximum percentage of opening of the high pressure bypass valve that is necessary to generate additional power in the steam turbine and then meet the spinning reserve requirements for PFR, without letting the pressure in the high pressure circuit to fall below the allowed values for the facility, while the bypass is open per the PFR requirements. This percentage of valve opening must be obtained also through empirical tests.

The pressure drop in the high pressure circuit, caused by bypassing part of the steam to the medium pressure circuit, is a very important parameter as if no action is taken, the circuit will remain in a lower pressure condition for a long period of time. To compensate for this effect, the method of the invention introduces a function called Active Load Bias (LB) to accelerate the process of energy recharge in the high pressure circuit. When the output energy required by PFR is below the base load, the control breaks the balance between the power generated by the gas turbines and the power generated by the steam turbine, introducing a bias set-point load appropriate for each turbine. The bias has a negative value for the steam turbine and a positive value for the gas turbines. Having the bias values as control outputs, the block develops a sort of regulation of the steam pressure. This action stops when the steam pressure reaches its original value.

If the spinning reserve requirement is not too demanding, in general it will be sufficient to work with the spinning reserves of the gas turbines and the spinning reserve of the steam turbine, by controlling the steam admission control valves, without using the high pressure by-pass. When the spinning reserve requirement of PFR exceeds a certain threshold to be determined for the facility, the by-pass will open to a preset value established by the tests, and control will continue to be carried out by the steam turbine admission valves.

When a prolonged drop in frequency occurs that exceeds the capacity of the accumulated spinning reserve energy in the high pressure circuit, said deficiency will be compensated by injecting water into the gas turbine compressors, thus exceeding the rated power of the gas turbines for as long as the disturbance persists. These are exceptional cases since demand peaks of spinning reserve energy for PFR in the power grids do not last longer than one minute, and therefore this last control mode will only be used a few minutes every year.

Figure 3:
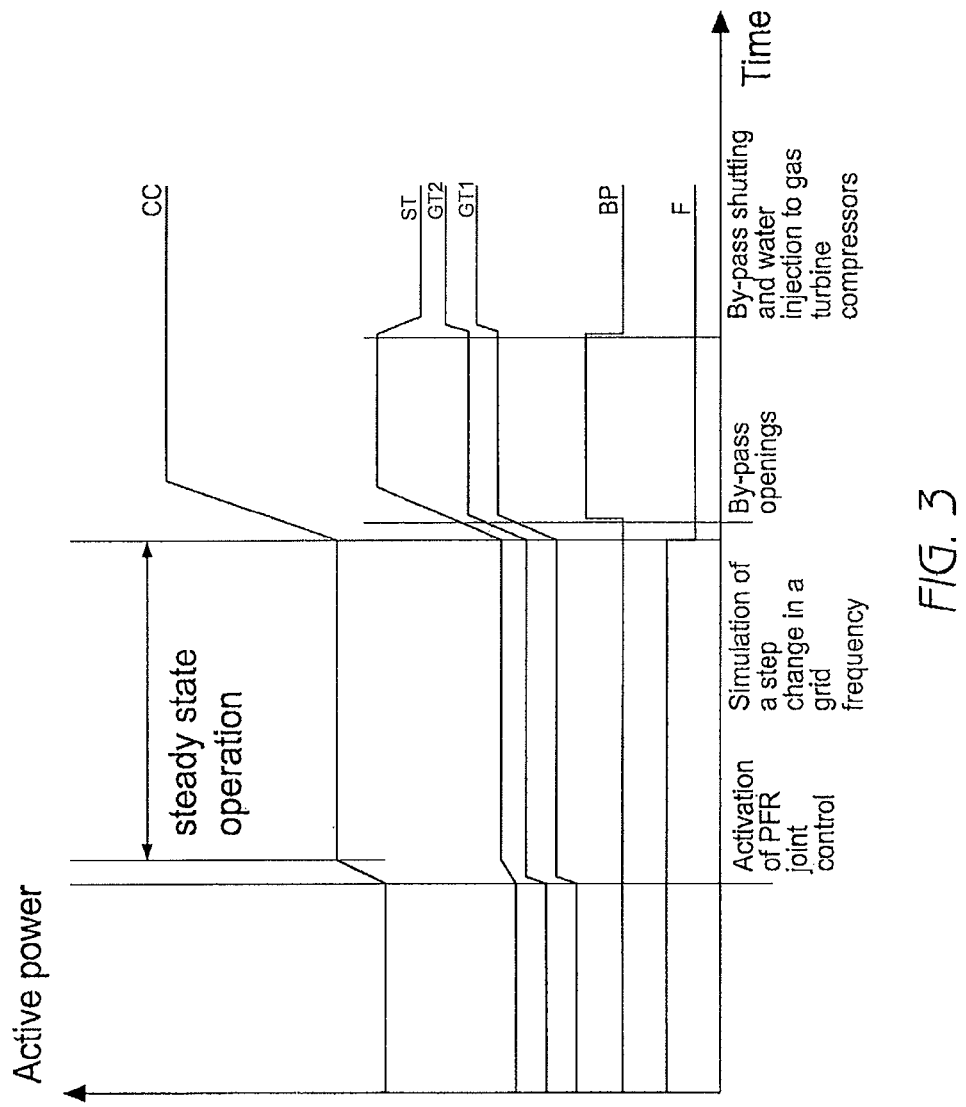
FIG. 3 shows the PFR-contributing Power Output Response by the turbines forming a combined cycle (one Steam Turbine and two Gas Turbines), triggered by a step increase in the reference frequency, using PFR Asymmetric Joint Control (e.g. 10% of PRF PFR).

FIG. 3 depicts the response of a combined cycle consisting of two gas turbines and one steam turbine operating with PFR according to the method of Asymmetric Joint Control of PFR of the present invention, upon the occurrence of a prolonged drop in the grid frequency. In FIG. 3 the same values as those in FIG. 1 were used, so as to compare the performance of the same combined cycle when the method of the invention is implemented. Curve F represents the simulated value of the frequency over time. An initial frequency value equal to the nominal value is assumed, then the frequency decreases. Curves GT1 and GT2 represent the performance of the respective gas turbine output powers, curve ST represents the performance of the steam turbine output power, and curve CC illustrates the overall combined cycle output power.

It must be noted in the first place that when the method of the invention is activated, the output power of the gas turbines increases, then decreasing the capacity of the spinning reserve energy for the PFR service. This increase in output power of the gas turbines causes an increase in the output power generated by the steam turbine, as said power is a function of the energy available in the exhaust gases from the gas turbines; an increase in the output power generated by the combined cycle is thus obtained.

In the second place, it can be seen that when a step-fashion frequency drop is simulated, both the gas turbines and the steam turbine increase power generation by delivering the available spinning reserve energy, but the gas turbines do it until reaching their nominal value. At that moment the high pressure by-pass valve is opened, as marked by BP in the curve, causing the output power of the steam turbine to continue increasing, thus compensating for the energy not delivered by the gas turbines. If the drop in frequency continues over time, the high pressure by-pass valve is closed as all the spinning reserve energy of the high pressure system has been absorbed. At that moment water is injected into the gas turbine compressors to compensate for the need of spinning energy to satisfy the PFR demand. This is accomplished by means of the mechanism used for washing the air compressors of the gas turbines, therefore no additional devices are required for water injection.

Description of the Method

To perform the method of the invention both the gas turbines and the steam turbine of the combined cycle should be participating in the FPR service and they should also be operating at full load.

The plant operator should then activate the PFR Asymmetric Joint Control. Once activated, the gas turbines increase the output power set point, then decreasing their spinning reserve energy for PFR. For such decrease in the spinning reserve energy, the control operates on the basis of the results of empirical tests on the additional output power that the steam turbine will generate when the high pressure valve is opened to a certain amount.

Then the PFR Asymmetric Joint Control enables a new control over the high pressure by-pass valve so as to allow, when required, a certain opening thereof and producing an increase in the output power generated by the steam turbine to compensate for the deficit in spinning energy in the gas turbines providing the PFR service.

Once the power in the gas turbines has reached their new output power set point, this value is compared to the maximum operating power, thus providing the new value of the spinning reserve energy, whose percentage will be less than that required by the grid at that moment.

Such a decrease in spinning reserve energy in the gas turbines will be compensated for by the steam turbine. This is achieved through an increase in the spinning reserve for PFR in the steam turbine, which is calculated as a function of the percentage required by the power grid and the deficit in the gas turbines. This additional spinning reserve energy can be delivered to the grid, if required, by opening the high pressure by-pass valve. As we have already seen, such pressure by-pass valve increases the output power of the steam turbine over a period of time. In summary, the spinning reserve for the combined cycle will strictly follow the grid requirements for a given requirement of spinning reserve energy for PFR from the Agency in charge of load dispatch.

The following description of the PFR Asymmetric Joint Control of the invention, shows the manner in which it operates as an improvement of the steam turbine combined cycle PFR control of U.S. Pat. No. 6,609,361 B1, where all other details of the improvement are described, since in the gas turbines, the method of the invention only increases the output power set point, thus reducing the spinning reserve energy but without varying the way in which frequency is regulated.

Figure 4:
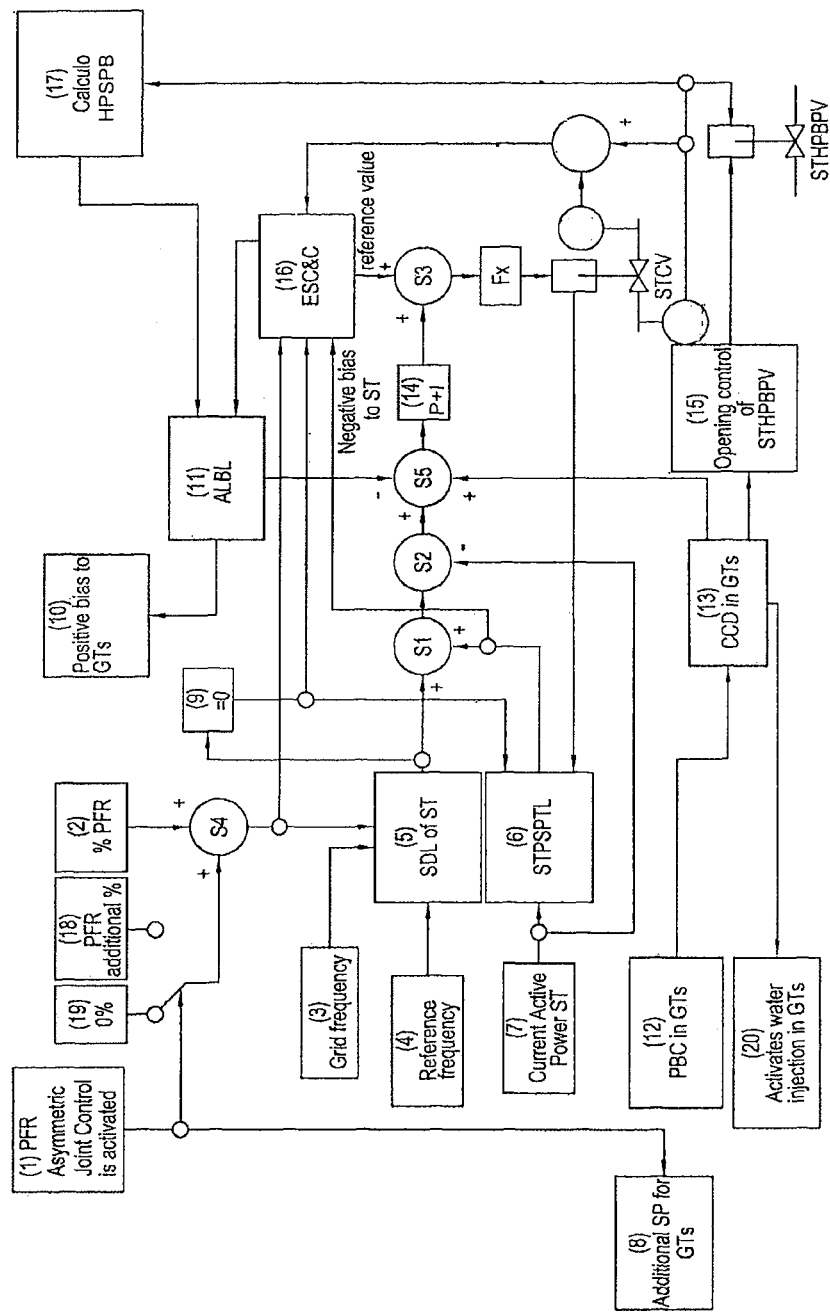
FIG. 4 shows a block diagram of the PFR Asymmetric Joint Control.
Figure 5:
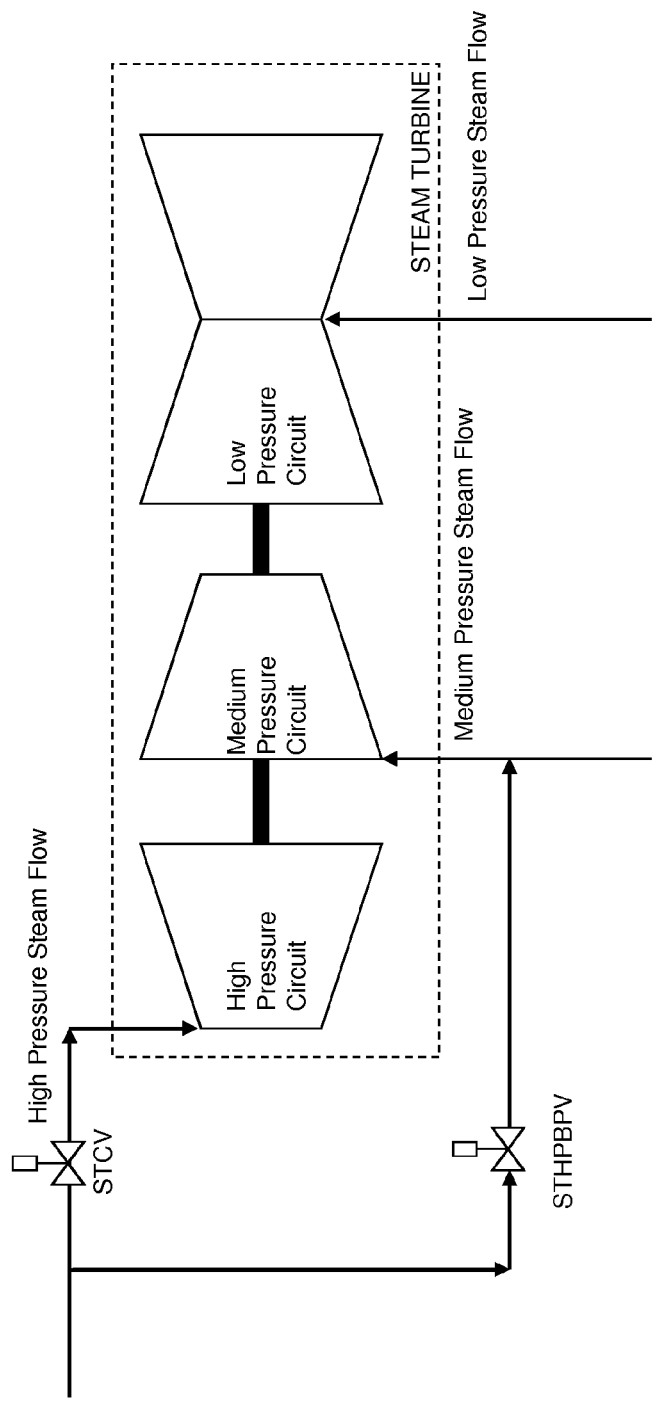
FIG. 5 shows the input of high pressure steam to the Steam Turbine High Pressure By-Pass Valve (STHPBPV) and its output to a medium pressure steam circuit of the steam turbine.
Figure 6:
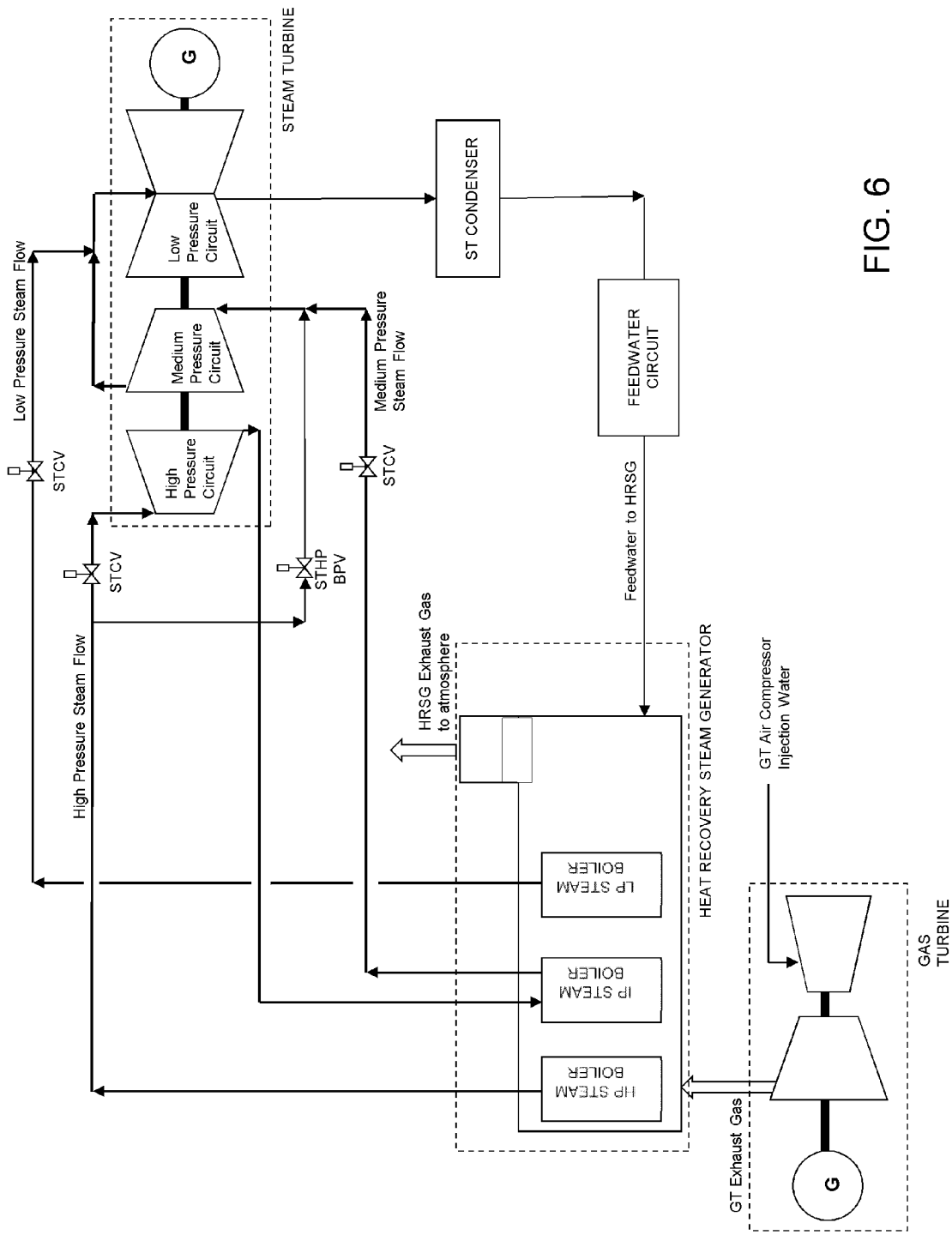
FIG. 6 shows a combined cycle power generation plant.

FIG. 4 illustrates a general block diagram of the method, followed by a description of the blocks.

When the PFR Asymmetric Joint Control (block 1) of the invention is activated, the control opening the high pressure by-pass valve (block 15) is enabled to operate in the PFR Asymmetric Joint Control, and the active power set point of the gas turbines is increased through block 8, thus causing a decrease in the percentage contribution to PFR. On the other hand, such a decrease is compensated by an increase in the percentage contribution to PFR of the steam turbine through control S4, where to the percentage of PFR entered by the plant operator in block 2 (% PFR) an additional percentage is added as a function of the decreased contribution to PFR of the gas turbines as given by block 18, i.e. when the method of the invention is activated, block 19 switches to block 18 as an addition to control S4. The output of S4 is the input to block 5 (SDL of ST) and to block 16 (ESC&C). Control block 5 outputs a PFR control signal that determines the amount of reserve energy of the steam turbine required to compensate for variations in the grid frequency, considering a reference frequency incorporated by the plant operator through block 4, the actual frequency of the grid of block 3, the PFR established dead band, the PFR droop and the percentage of PFR resulting from block 4 which takes into account the percentage pre-established by the plant operator through block 2 and the necessary additional contribution of block 18 to compensate the decrease in contribution by the gas turbines. Control block 6 (STPSPTL) establishes the appropriate output power set point of the steam turbine at any time, given the problem existing in combined cycle facilities, in which it is impossible to predict exactly what is the available power that would cause instability in PFR. This happens because in a combined cycle plant the steam turbine must generate as much power as possible according to the current condition of the gas turbines in their basic design. To this end, when necessary, this special block corrects and updates the output power set point of the steam turbine. This block operates when the signal requiring PFR is equal to zero, as shown by block 9, causing block 6 to take the actual value of the steam turbine output power. Control block 16 (ESC&C) keeps at any time the appropriate amount of energy stored for frequency regulation, by throttling the admission control valves to the steam turbine (STCV), as it is necessary to ensure that the steam turbine can supply the maximum load that may be required. The function of control S1 is to add the outputs of block 5 (SDL) and block 6 (STPSPTL), obtaining as a result the output power required from the steam turbine by the grid for a given change in the grid frequency. On the other hand, function S2 compares the output power required by the grid (output of S1) with the actual active power from the steam turbine of block 7. In the known methods, PFR output of S2 would be the input to a proportional plus integral (P+I) controller 14 that controls the final position of the steam turbine control valve. In the present invention, the output of S2 inputs control S5, which also receives a signal from block 13 (CCD in gas turbines) representing the power required to compensate for the deficiency of the gas turbines, and which also receives a signal from block 11 representing the negative bias to the steam turbine used to recharge the high pressure systems described below. The output signal from S5 is the input to the proportional plus integral controller 14 that is then added in control S3 to the reference value output from block 16 (ESC&C), thus giving the position value required by the steam turbine control valve (STCV) for each condition, through the use of a characteristic function of the steam valve Fx.

Control block 13 (CCD of gas turbines) is used to detect whether the gas turbines, because of a drop in grid frequency, are near their ceiling power value, i.e. the maximum value of reserve power that they can supply for PFR, according to the deviation between the value of power required by the system and the ceiling value of the gas turbines provided by block 12. It should be noted that the method of the invention reduces the spinning energy of the gas turbines to increase the net generated power of the combined cycle. Therefore, when the spinning energy of the gas turbines is reduced to increase the net generated power of the combined cycle, block 13 outputs a signal to open the high pressure control valve of block 15 (STHPBVP) causing the valve to open so as to compensate for the spinning energy of the complete combined cycle that is not being supplied by the gas turbines. The signal from block 13 opens the high pressure by-pass control valves to a preset value, thus causing an increase in the output power of the steam turbine. Simultaneously, the deviations in the gas turbines, which up to that moment must have a positive value of energy, will adjust the load of the steam turbine through function S5, thus accomplishing a joint control of the output power of the combined cycle. Therefore the power required by PFR that cannot be supplied by the gas turbines will be supplied in this case by the steam turbine.

Control block 11 (ALBL) is used to recharge the high pressure system by the method of the invention to face varying demands. When the opening of the high pressure by-pass valves is required, there will be a drop in the high pressure steam pressure that is detected by sensor PS. If no action is taken, the high pressure circuit would remain in such condition for a long time. The function of block 11 is to accelerate the energy recharging process. When the output energy required by PFR is lower than the full load according to the calculations made by block 17 (HPSPB), control 11 breaks the balance between the output energies, introducing a load bias set point which is appropriate for each turbine, by outputting a positive bias signal to the gas turbines and a negative bias signal to the steam turbine. Being the bias values the output of control 11, the block develops a sort of regulation of the steam pressure. Such regulating action will stop when the steam pressure reaches its original value.

Additionally, the method of the invention introduces an additional control for those cases where the drop in frequency lasts long enough so as to exceed the capability of the accumulated spinning reserve energy in the high pressure circuit, calculated as a function of the time that the gas turbines are in the ceiling position (block 13). This control allows the gas turbines to supply additional power by injecting water (block 20) at the input of the air compressors of the gas turbines, thus causing an increase in the power generated by the steam turbine to compensate for the deficit in spinning energy in the gas turbines for PFR service. This control will be activated exceptionally as in power grids the maximum demands of spinning reserve energy for PFR are very short. Should the frequency drop persist in time, other external controls will contribute to frequency stabilization, such as secondary frequency regulation or the disconnection of loads from the grid.

What is claimed is:

1. A method of operating a combined cycle power generation plant comprising a gas turbine and a steam turbine, the method comprising:
   maintaining spinning reserve energy of the steam turbine by throttling control valves of the steam turbine, wherein the steam turbine operates at three different steam pressures which include high pressure, medium pressure and low pressure,
   increasing net power output of the gas turbine, thereby causing a reduction in a spinning reserve energy of the gas turbine, and
   controlling a flow of the high pressure steam to a medium pressure steam circuit through a bypass to compensate for the reduction of the spinning reserve energy of the gas turbine, wherein increasing the flow of the high pressure steam to the medium pressure steam circuit through the bypass causes an increase in power output by the steam turbine.

2. The method according to claim 1, wherein, in order to obtain additional power from the steam turbine during a certain period of time, controlling comprises opening a bypass valve connected to the bypass to flow at least part of the high pressure steam toward the medium pressure steam circuit of the steam turbine.

3. The method according to claim 2, wherein the additional power from the steam turbine is obtained without additional external energy.

4. The method according to claim 1, said method further comprising:
   determining an additional power to be produced by the steam turbine when bypassing the high pressure steam to the medium pressure steam circuit to determine additional spinning reserve energy of the steam turbine;
   determining the maximum amount of opening of a bypass valve connected to the bypass to generate the additional power in the steam turbine;
   increasing an output power set point of the gas turbine;
   once the power from the gas turbine has reached the increased output power set point, comparing the increased output power set point with the maximum operating power of the gas turbine to calculate the reduced spinning reserve energy of the gas turbine; and
   wherein controlling comprises opening the bypass valve of the steam turbine to compensate for the reduced spinning reserve energy of the gas turbine.

5. The method according to claim 1, further comprising:
   injecting water to an air compressor of the gas turbine to increase the power generated by the steam turbine.

* * * * *